Dec. 11, 1928.
H. BANY ET AL
1,695,004
AUTOMATIC CONTROL SYSTEM
Filed July 22, 1927
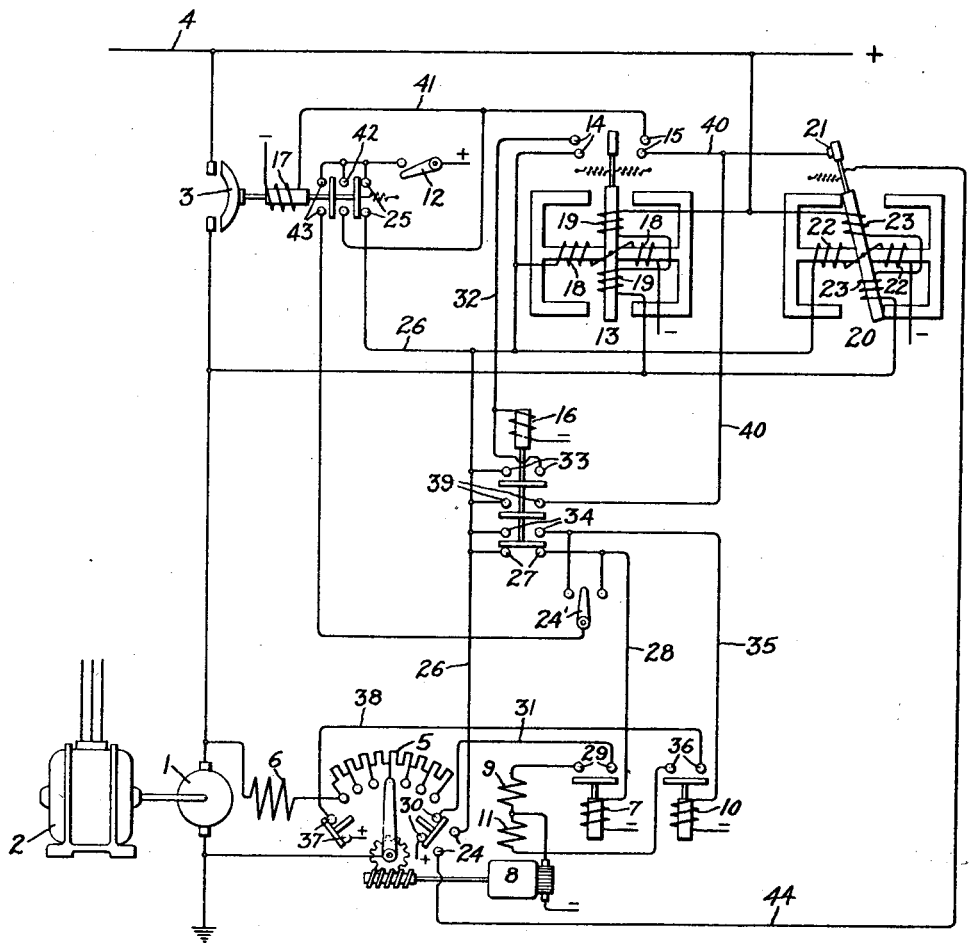
Inventors:
Herman Bany,
Harold T. Seeley,
by Alexander S. Lamb
Their Attorney Patented Dec. 11, 1928.

1,695,004

UNITED STATES PATENT OFFICE.

HERMAN BANY, OF SCOTIA, NEW YORK, AND HAROLD T. SEELEY, OF YEADON, PENNSYLVANIA, ASSIGNORS TO GENERAL ELECTRIC COMPANY, A CORPORATION OF NEW YORK.

AUTOMATIC CONTROL SYSTEM.

Application filed July 22, 1927. Serial No. 207,788.

Our invention relates to automatic control systems, and more particularly to an improved arrangement for connecting a generator or other source of current to a load circuit.

Where a load circuit is adapted to be supplied from several sources, when one of the sources is to be connected thereto it may happen that the load circuit is at the time energized from another source, and has substantially normal voltage thereon. It may also happen that the load circuit is not supplied from any other source at the time the desired source is to be connected thereto, in which case there is no voltage on the load circuit. In case there is an abnormal load on the load circuit, for example in case of a fault therein, it may happen that the load circuit voltage is abnormally low even though another source be connected thereto. When the load circuit is without voltage or is abnormally low, the source voltage should be adjusted to a relatively low value before it is connected to the load circuit, to prevent a large rush of current when the connection is made. When the load circuit is energized under normal conditions from some other source, it is desirable to make the connection when the source voltage is slightly higher than the load circuit voltage, in order to prevent a flow of power from the load circuit to the source when the connection is established.

Where automatic means are provided for adjusting the source voltage in response to the relative voltages of the source and the load circuit, such means will operate to lower the source voltage when it is higher than the voltage of the load circuit. It is desirable in such a case to arrange the apparatus so that the switching means which connects the source to the load circuit shall be closed only when the voltage adjusting means is operating to raise the source voltage from below to above the voltage of the load circuit, since if the switching means is arranged to close whenever the voltage of the source is slightly higher than the voltage of the load circuit it may do so while the voltage adjusting means is operating to lower the source voltage, and it may happen that by the time the switching means is closed the source voltage will be lower than that of the load circuit, thereby resulting in a reversal of power, since the load circuit will supply power to the source until the voltage adjusting means operates to raise the source voltage.

An object of our invention is to provide a control system of the character described which shall lower the source voltage when it is higher than the load circuit voltage, and which shall begin to raise the source voltage again as soon as it has been decreased to a value slightly below the load circuit voltage, whatever that load circuit voltage may happen to be, when supplied from some other source, and which shall lower the source voltage to a value at which the switching means may be closed without an objectionable rush of current when the load circuit is without voltage at the time the source is to be connected thereto.

The single figure of the drawing shows the invention in diagrammatic form.

Our invention will be better understood from the following description, in connection with the accompanying drawing, and its scope will be pointed out in the appended claims.

In the embodiment of our invention illustrated in the drawing, we have represented the source of current as a generator 1, driven by a suitable source of power, shown as an alternating-current motor 2. The switching means 3 which may be of any suitable type, examples of which are well-known in the art, is arranged to connect this generator 1 to the load circuit 4, which is adapted to be supplied from some other source of current, not shown, but which may or may not have some other source connected thereto at the time the switching means 3 is to be closed.

For adjusting the voltage of the generator 1, suitable means are provided, which we have illustrated as comprising a motor operated rheostat 5 in the circuit of the shunt field winding 6 of the generator 1. For controlling the operation of the rheostat 5, a control relay 7 is provided which when energized completes a circuit for the motor 8 of the motor operated rheostat and its field winding 9 so that the motor rotates in a direction to increase the resistance in the circuit of the shunt field winding 6, and a control relay 10 is provided which when energized completes a circuit for the motor 8 and its field winding 11, which is wound differentially with respect to field winding 9, so that the motor 8 rotates in a direction to decrease the resistance in the circuit of the shunt field winding 6.

12 is a suitable control device which is adapted to be operated when it is desired to connect the source 1 to the load circuit 4. As shown in the drawing it is a manually controlled switch, but in practice it may be any other suitable manually or automatically operated device, examples of which are well-known in the art, which is operated at the proper time to effect the connection of the source to the load circuit.

It is desirable that the circuit breaker 3 shall not close after the switch 12 is closed until the voltage of the source 1 has been increased from a value slightly below the load circuit voltage in case the load circuit is energized by some other source to a value slightly higher than the load circuit voltage or the voltage of the source 1 has been reduced to a relatively low value in case the load circuit is not energized by some other source.

In accordance with our invention the closing of the switch 12 effects the completion of a circuit for the control relay 7 to effect a decrease in the voltage of the source 1 in case this voltage is higher than the load circuit voltage at the time switch 12 is closed.

13 is a suitable control device, examples of which are well-known in the art, which is connected so that it responds to the relative voltages of the source 1 and the load circuit 4. When the source voltage is less than the load circuit voltage the device 13 closes contacts 14 and when the source voltage is greater than the load circuit voltage the device 13 closes contacts 15. The contacts 14 are in the circuit of a control relay 16 which becomes energized as soon as the load circuit voltage exceeds the source voltage after the switch 12 is closed. The relay 16, when energized, opens the circuit of control relay 7 and completes the circuit of the control relay 10 so as to increase the voltage of the source 1 to a value above the load circuit voltage when the device 13 operates to close its contacts 15 and thereby complete a circuit for the closing coil 17 of the circuit breaker 3.

As shown the control device 13 is a differential relay of the polarized type and comprises a polarizing winding 18 connected across a suitable source of direct current and an operating winding 19 connected across the terminals of the circuit breaker 3 so that it has impressed thereon a voltage equal to the difference between the voltages of the source 1 and the load circuit 4 and the current therein flows in a direction depending upon which voltage is the higher.

In order to effect the closing of the circuit breaker 3 when the switch 12 is closed at a time when either the load circuit is deenergized or the voltage thereof is lower than the minimum voltage of the generator, so that the relay 13 cannot operate to effect the energization of the relay 16, we provide a differential relay 20 which is responsive to the relative voltage of the source 1 and the load circuit 4. This relay is arranged to maintain contacts 21 closed at all times except when the voltage of the source 1 exceeds the load circuit 4 a predetermined value. As shown the relay 20 is of the polarized type and comprises a magnetizing winding 22 connected across a suitable source of direct current and a control winding 23 connected across the terminals of the circuit breaker 3. The relay 20 together with suitable means indicating that the voltage of the source 1 is at its minimum voltage are employed to control the closing of the circuit breaker 3. For indicating that the voltage of the source 1 is at its minimum value we provide the motor operated rheostat 5 with auxiliary contacts 24 which are arranged in any suitable manner, examples of which are well-known in the art, so that they are closed when all of the resistance of the rheostat is connected in the circuit of the shunt field winding 6. The contacts 21 and 24 are connected in series in a circuit for the closing coil 17 of the circuit breaker 3 which is completed when the control switch 12 is closed.

24' represents any suitable control device for controlling the operation of the motor operated rheostat 5 after the circuit breaker 3 is closed so as to maintain a predetermined generator voltage or current output. In actual practice the control device 24' may be an automatic device, examples of which are well-known in the art, which is responsive to the electrical condition it is desired to maintain.

The operation of the arrangement shown is as follows: It will be assumed first that the source 1 is in operation, that the load circuit 4 is energized by some other source, and that the control switch 12 is closed at a time when the voltage of the source 1 is higher than the load circuit voltage so that the contacts 15 of the relay 13 are closed and the contacts 21 of relay 20 are open.

The closing of the switch 12 completes a circuit for the control relay 7 from one side of a suitable control circuit through switch 12, auxiliary contacts 25 on the circuit breaker 3, conductor 26, contacts 27 of relay 16, conductor 28, coil of relay 7 to the other side of the control circuit. Relay 7 by closing its contacts 29 completes a circuit for the motor 8 so that motor 8 rotates in a direction to insert resistance into the circuit of the shunt field winding 6 and thereby decrease the voltage of the source 1 to a value below the load circuit voltage. The circuit of the motor 8 is from one side of a suitable control circuit through limit switch contacts 30 on the rheostat 5 which are closed except when all of the resistance of the rheostat is connected in the shunt field circuit, conductor 31, contacts 29 of relay 7, field winding 9 and the armature of motor 8 to the other side of the control circuit.

As soon as the voltage of the source 1 has been decreased to a value slightly below the voltage of the load circuit 4, relay 13 operates to open its contacts 15 and closes its contacts 14 thereby completing a circuit for the relay 16. This circuit is from one side of the control circuit through switch 12, auxiliary contacts 25 on the circuit breaker 3, conductor 26, contacts 14 of relay 13, conductor 32, coil of relay 16 to the other side of the control circuit. Relay 16 by closing its contacts 33 completes a locking circuit for itself which is independent of the contacts 14 of relay 13. Relay 16 by opening its contacts 27 opens the circuit of relay 7 so as to prevent further reduction of the source voltage and by closing its contacts 34 completes a circuit for the relay 10 to effect an increase in the voltage of the source 1. The circuit of the relay 10 is from one side of the control circuit through switch 12, auxiliary contacts 25 on the circuit breaker 3, conductor 26, contacts 34 of relay 16, conductor 35, coil of relay 10 to the other side of the control circuit. Relay 10 by closing its contacts 36 completes a circuit for the motor 8 so that the motor operates in a direction to cut out resistance from the circuit of the field winding 6. This circuit is from one side of the control circuit through auxiliary contacts 37 on the rheostat which are open only when all of the resistance of the rheostat 5 is cut out of the field circuit, conductor 38, contacts 36 of relay 10, field winding 11 and armature of motor 8 to the other side of the control circuit.

As soon as the voltage of the source 1 exceeds the load circuit voltage, relay 13 closes its contacts 15 and thereby completes a circuit for the closing coil 17 of the circuit breaker 3. This circuit is from one side of the control circuit through control switch 12, auxiliary contacts 25 on the circuit breaker 3, conductor 26, contacts 39 of relay 16, conductor 40, contacts 15 of relay 13, conductor 41, closing coil 17 to the other side of the control circuit. Circuit breaker 3 by closing its auxiliary contacts 42 completes a locking circuit for its closing coil 17 which is independent of the relays 13 and 16, so that the closing coil is not deenergized when these relays open their respective contacts in response to the closing of the circuit breaker.

After the circuit breaker 3 closes its auxiliary contacts 43 and source 1 is connected to the load circuit, the voltage and current output of the source 1 may be varied by operating the control switch 24' so as to energize either relay 7 or relay 10 as desired.

If the control switch 12 is closed at a time when the load circuit voltage is less than the voltage of the source 1 so that the contacts 14 of relay 13 are closed, the relay 16 is energized as soon as the control switch 12 is closed, whereupon the voltage of the source 1 is immediately raised to a value above the load circuit voltage when the relay 13 closes its contacts 15 and effects the closing of the circuit breaker 3 in the manner above described.

It will now be assumed that the control switch 12 is closed at a time when the load circuit is not energized by another source and, therefore, the voltage of source 1 is still greater than the load circuit voltage after the rheostat 5 has been moved so that all of its resistance is in the circuit of the shunt field winding 6. The closing of switch 12 effects in the manner above described the energization of the relay 7 which in turn causes the motor 8 to rotate in a direction to insert resistance into the circuit of the field winding 6. After a predetermined amount of resistance has been inserted in the shunt field circuit, auxiliary contacts 30 in the circuit of motor 8 and its field winding 9 are opened and auxiliary contacts 24 are closed. If the voltage of the source does not exceed the load circuit voltage by more than a predetermined amount so that the contacts 21 are open, the closing of the auxiliary contacts 24 completes a circuit for the closing coil 17 to effect the closing of the circuit breaker 3. This circuit is from one side of the control circuit, through switch 12, auxiliary contacts 25 on circuit breaker 3, conductor 26, auxiliary contacts 24 on rheostat 5, conductor 44, contacts 21 of relay 20, conductor 40, contacts 15 of relay 13 which are closed since the source voltage is greater than the load circuit voltage, conductor 41, closing coil 17 to the other side of the control source.

While we have in accordance with the patent statutes shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:—

1. In combination, a source of current, a load circuit, switching means for connecting the source to the load circuit, means for adjusting the voltage of said source, means for controlling the operation of said voltage adjusting means comprising a device responsive to the relative voltages of said source and said load circuit and arranged to cause the voltage adjusting means to increase the voltage of said source when it is lower than the load circuit voltage, and means controlled by said device for effecting the closing of said switching means only after said device has first effected the operation of said voltage adjusting means to increase the source voltage.

2. In combination, a source of current, a load circuit, switching means for connecting the source to the load circuit, means for adjusting the voltage of said source, a relay for controlling the operation of said voltage adjusting means, said relay being arranged when in one position to effect the operation of said voltage adjusting means to lower the voltage of said source and when in another position to effect the operation of said voltage adjusting means to raise the voltage of said source, and means responsive to the relative voltages of the source and load circuit arranged when the voltage of the source is lower than the load circuit voltage to effect the operation of said relay to its voltage raising position, and when the voltage of the source subsequently exceeds the voltage of the load circuit, to effect the closing of said switching means.

3. In combination, a source of current, a load circuit, switching means for connecting the source to the load circuit, means for adjusting the voltage of said source comprising a relay arranged in one position to effect the lowering of the source voltage and in another position to effect the raising of the source voltage, and means responsive to the relative voltages of said source and said load circuit arranged to move said relay from voltage lowering position to voltage raising position when the voltage of the source is less than the voltage of the load circuit, and contacts controlled by said relative voltage responsive means arranged to cooperate with contacts of said relay for effecting the closing said switching means when said relay is in its voltage raising position and the voltage of said source is higher than the voltage of said load circuit.

4. In combination, a source of current, a load circuit, switching means for connecting the source to the load circuit, means for adjusting the voltage of said source, and means responsive to the relative voltages of the source and load circuit for controlling the operation of said voltage adjusting means to increase and decrease the source voltage while said switching means is open and to effect the closing of said switching means only when the source voltage is increased from a value below the load circuit voltage to a value above the load circuit voltage.

5. In combination, a source of current, a load circuit, switching means for connecting the source to the load circuit, means for adjusting the voltage of said source, means responsive to the relative voltages of the source and load circuit for controlling the operation of said voltages adjusting means to increase and decrease the source voltage while said switching means is open and to effect the closing of said switching means when the source voltage is increased from a value below the load circuit voltage to a value above the load circuit voltage, and means controlled by the voltage of such source for effecting the closing of said switching means independently of said relative voltage responsive means when the voltage of said source has been reduced to a predetermined value.

6. In combination, a source of current, a load circuit, switching means for connecting the source to the load circuit, means for adjusting the voltage of said source, means responsive to the relative voltages of the source and load circuit for controlling the operation of said voltage adjusting means to increase and decrease the source voltage while said switching means is open and to effect the closing of said switching means when the source voltage is increased from a value below the load circuit voltage to a value above the load circuit voltage, and other means controlled by the voltage of said source for effecting the closing of said switching means independently of said relative voltage responsive means when the voltage of said source has been reduced to a predetermined value and the voltage of said source does not exceed the load circuit voltage more than a predetermined amount.

7. In combination, a source of current, a load circuit, switching means for connecting the source to the load circuit, means for adjusting the voltage of said source comprising a relay arranged in one position to effect the lowering of the source voltage and in another position to effect the raising of the source voltage, means responsive to the relative voltages of said source and said load circuit arranged to move said relay from voltage lowering position to voltage raising position when the voltage of the source is less than the voltage of the load circuit, contacts controlled by said relative voltage responsive means arranged to cooperate with contacts on said relay for closing said switching means when said relay is in voltage raising position and the voltage of said source is higher than the voltage of said load circuit, other means responsive to the relative voltages of said source and load circuit, and contacts controlled by said last mentioned relative voltage responsive means and said voltage adjusting means for effecting the closing of said switching means when the voltage difference between the source and load circuit is less than a predetermined value and the voltage adjusting means is in a predetermined condition.

8. In combination, a source of current, a load circuit, switching means for connecting the source to the load circuit, and means operative to effect the closing of said switching means only when the voltage of said source is greater than but does not exceed the voltage of the load circuit more than a predetermined amount.

9. In combination, a source of current, a load circuit, switching means for connecting the source of the load circuit, means for adjusting the voltage of said source, and means operative to effect the closing of said circuit breaker only when the voltage adjusting means has reduced the source voltage to a predetermined minimum value and the voltage of said source does not exceed the load circuit voltage more than a predetermined amount.

10. In combination, a source of current, a load circuit, switching means for connecting the source to the load circuit, means for adjusting the voltage of said source, a control circuit for said switching means, contacts in said circuit arranged to be closed when said voltage adjusting means occupies a predetermined position, means responsive to the relative voltages of said source and load circuit, and other contacts in said control circuit controlled by said voltage responsive means so as to be opened only when the source voltage exceeds the load circuit voltage a predetermined amount.

11. In combination, a source of current, an electric circuit, switching means for connecting said source to said circuit, means for adjusting the voltage of said source, control means arranged when deenergized to cause said voltage adjusting means to decrease the voltage of said source and when energized to cause said voltage adjusting means to increase the voltage of said source, and means responsive to the relative voltages of said source and circuit to energize said control means when the voltage of said source is below the voltage of said circuit and to effect the closing of said switching means when the voltage of said source is higher than the voltage of said circuit and said control means is energized.

12. In combination, a source of current, an electric circuit, switching means for connecting said source to said circuit, means for adjusting the voltage of said source, a control relay arranged when deenergized to cause said voltage adjusting means to decrease the voltage of said source and when energized to cause said voltage adjusting means to increase the voltage of said source, a differential relay responsive to the relative voltages of said source and circuit to energize said control relay when the voltage of said source is below the voltage of said circuit and to effect the connection of said source to said circuit when the voltage of said source is higher than the voltage of said circuit and said control relay is energized and a relay responsive to the relative voltages of said source and circuit arranged to effect the connection of said source to said circuit when the voltage of said source has been decreased to a predetermined value and the voltage difference between said source and circuit voltages is less than a predetermined amount.

In witness whereof, we have hereunto respectively set our hands the 18th day of July 1927, and the 20th day of July, 1927.

HERMAN BANY.
HAROLD T. SEELEY.